United States Patent
Chang et al.

(10) Patent No.: US 8,523,405 B2
(45) Date of Patent: Sep. 3, 2013

(54) TWO-COLOR MIXING LED ILLUMINATING DEVICE

(75) Inventors: Shao-Han Chang, New Taipei (TW); Qing-Shan Cao, Shenzhen (CN); Su-Tzong Liu, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 143 days.

(21) Appl. No.: 13/090,278

(22) Filed: Apr. 20, 2011

(65) Prior Publication Data
US 2012/0075847 A1    Mar. 29, 2012

(30) Foreign Application Priority Data
Sep. 24, 2010  (CN) .......................... 2010 1 0289391

(51) Int. Cl.
*F21V 5/04* (2006.01)
*F21V 5/00* (2006.01)
*G02B 6/38* (2006.01)

(52) U.S. Cl.
USPC ................ 362/311.02; 362/339; 362/620

(58) Field of Classification Search
USPC ............................. 362/311.02, 339, 520, 620
See application file for complete search history.

(56) References Cited

U.S. PATENT DOCUMENTS

| | | | | |
|---|---|---|---|---|
| 3,829,680 | A | * | 8/1974 | Jones .............................. 362/330 |
| 4,851,164 | A | * | 7/1989 | Hayashi ....................... 264/1.36 |
| 5,377,084 | A | * | 12/1994 | Kojima et al. ................. 362/618 |
| 7,695,168 | B2 | * | 4/2010 | Gueyvandov et al. ........ 362/339 |
| 2004/0174710 | A1 | * | 9/2004 | Gappelberg .................. 362/337 |
| 2007/0165395 | A1 | * | 7/2007 | Yang ................................ 362/97 |
| 2008/0192465 | A1 | * | 8/2008 | Huang et al. .................. 362/231 |
| 2009/0027885 | A1 | * | 1/2009 | Hoshi ............................ 362/244 |
| 2010/0002462 | A1 | * | 1/2010 | Chang ........................... 362/606 |
| 2010/0079978 | A1 | * | 4/2010 | Nakamura ................... 362/97.1 |

* cited by examiner

*Primary Examiner* — David J Makiya
*Assistant Examiner* — Bryon T Gyllstrom
(74) *Attorney, Agent, or Firm* — Altis Law Group, Inc.

(57) ABSTRACT

An LED illuminating device comprises a housing with a base plate, a prism sheet and a circuit board. The prism sheet is mounted in the housing and comprises a number of V-shaped micro-grooves formed thereon along three directions intersecting with each other. The circuit board is fixed on the base plate, wherein a plurality of LED units are arranged on the circuit board, each two adjacent LED units are spaced a preset distance apart from each other and emit light of different colors. Six virtual mixed light sources are formed by reflection of the prism sheet to the circuit board when the light emitted by an LED unit mixes with light emitted from adjacent LED units on the circuit board. Each of the virtual mixed light sources has a color different from the colors of the light emitted from the LED units.

6 Claims, 5 Drawing Sheets

TWO-COLOR MIXING LED ILLUMINATING DEVICE

CROSS-REFERENCES TO RELATED APPLICATIONS

Related subject matter is disclosed in a co-pending U.S. patent application Ser. No. 13/090,276 a title of TWO-COLOR MIXING LED ILLUMINATING DEVICE, which has the same assignee as the current application and was concurrently filed.

BACKGROUND

1. Technical Field

The present disclosure relates to light emitting diode (LED) illuminating devices, especially to a two-color mixing LED illuminating device.

2. Description of Related Art

Compared to many other kinds of illuminating devices, LED illuminating devices have many advantages, such as high luminous efficiency, low power consumption, and long service life. Even still, LED lights have disadvantages. The range of colors currently available for LEDs is limited. LEDs only come in a few basic colors, which cannot satisfy the needs of different users in particular applications.

Therefore, what is needed is an LED illuminating device that can overcome the above mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
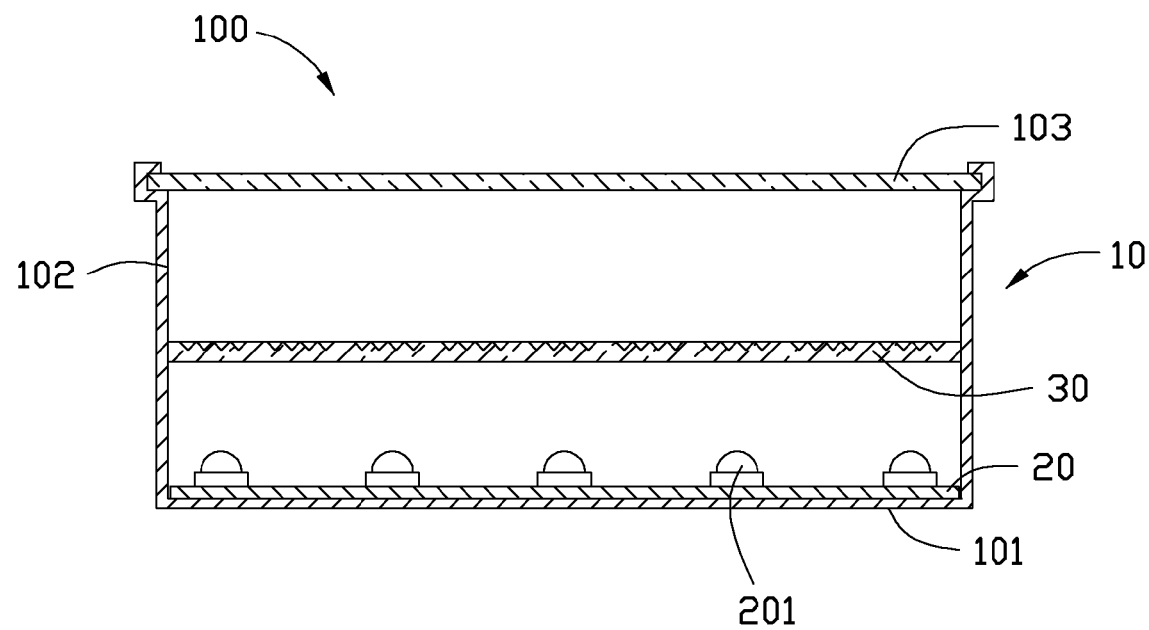
FIG. 1 is a cross-sectional view of an LED illuminating device according to an embodiment.

Referring to FIG. 1, a light emitting diode (LED) illuminating device 100 according to an embodiment is disclosed. The LED illuminating device 100 includes a housing 10, a circuit board 20, and a prism sheet 30. A number of LED units 201 are arranged on the circuit board 20. The housing 10 includes a base plate 101, a sidewall 102 surrounding the base plate 101, and a protective cover 103. The circuit board 20 is fixed on the base plate 101, and the prism sheet 30 is arranged above the circuit board 20 and substantially parallel to the circuit board 20. The protective cover 103 is fixed on the sidewall 102 and placed above the prism sheet 30 for protecting the prism sheet 30 and the circuit board 20 from being contaminated or damaged. In the embodiment, the protective cover 103 is made of transparent glass or transparent plastic plates. The base plate 101 and the sidewall 102 are made of metal or plastic having high reflectivity.

Figure 2:
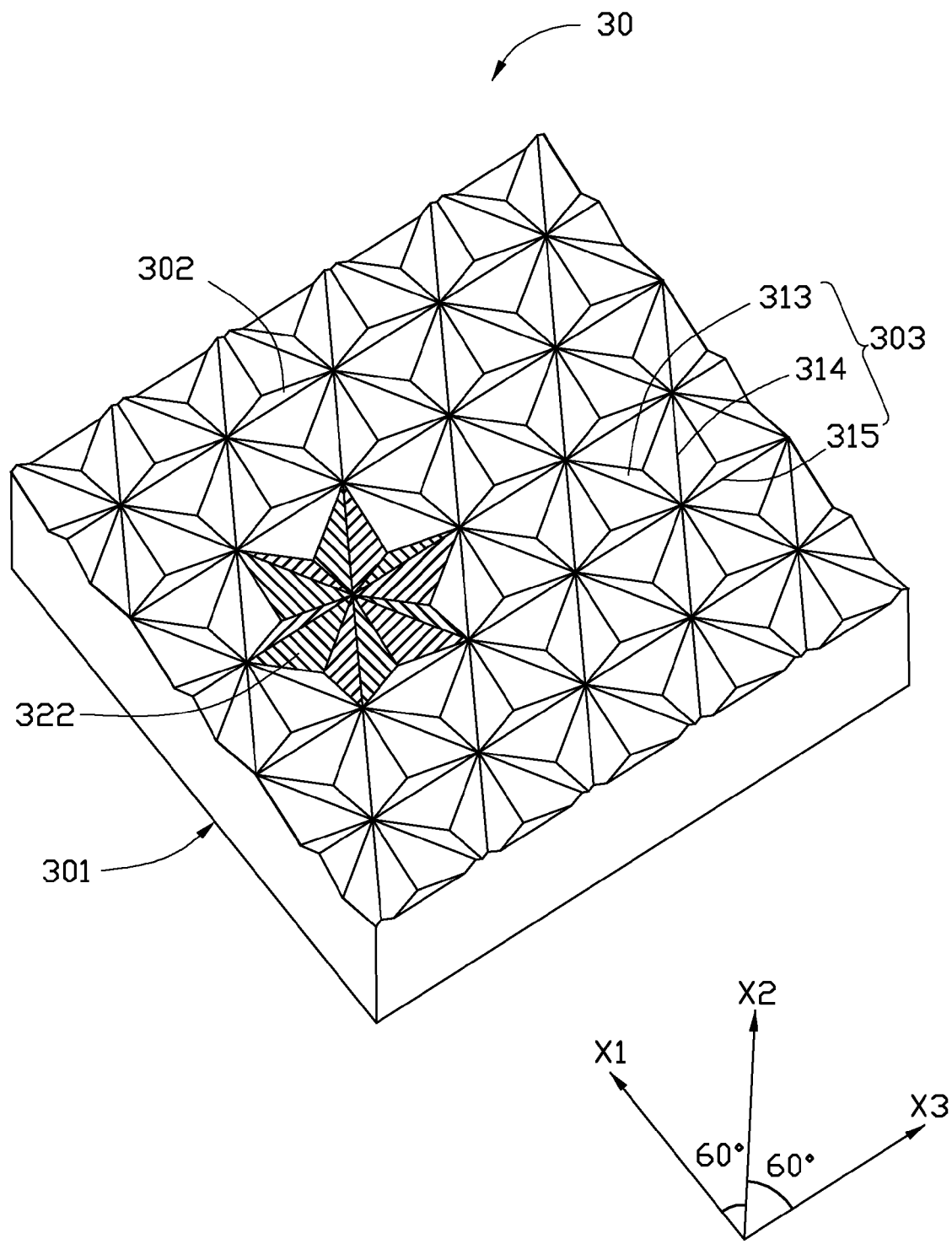
FIG. 2 is a partial, isometric view of a prism sheet of the LED illuminating device of FIG. 1.

Referring to FIG. 2, the prism sheet 30 can be made of transparent plastic and includes a light incident surface 301 and a light exit surface 302 opposite to the light incident surface 301. The light incident surface 301 is planar and faces the circuit board 20. A number of V-shaped micro-grooves 303 are formed on the light exit surface 302 along three directions. The three directions of the V-shaped micro-grooves 303 intersect with each other. In the embodiment, an angle between each two adjacent extending directions of the micro-grooves 303 is about 60 degrees. The V-shaped micro-grooves 303 include a first type of V-shaped micro-grooves 313 extending along a first direction X1, a second type of V-shaped micro-grooves 314 extending along a second direction X2, and a third type of V-shaped micro-grooves 314 extending along a third direction X3 intersecting with the first direction X1 and the second direction X2, in one embodiment, all three type of V-shaped micro-grooves are the same. The micro-grooves 303 extending along three directions intersect with each other to form a number of six-point stars 322 at their intersections.

Figure 3:
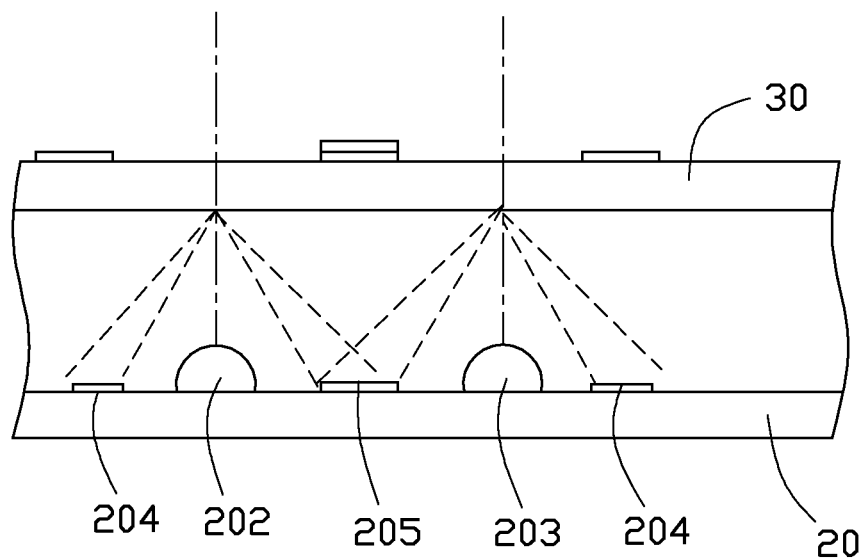
FIG. 3 is a schematic, side view showing the LED illuminating device that forms a plurality of virtual light sources.
Figure 4:
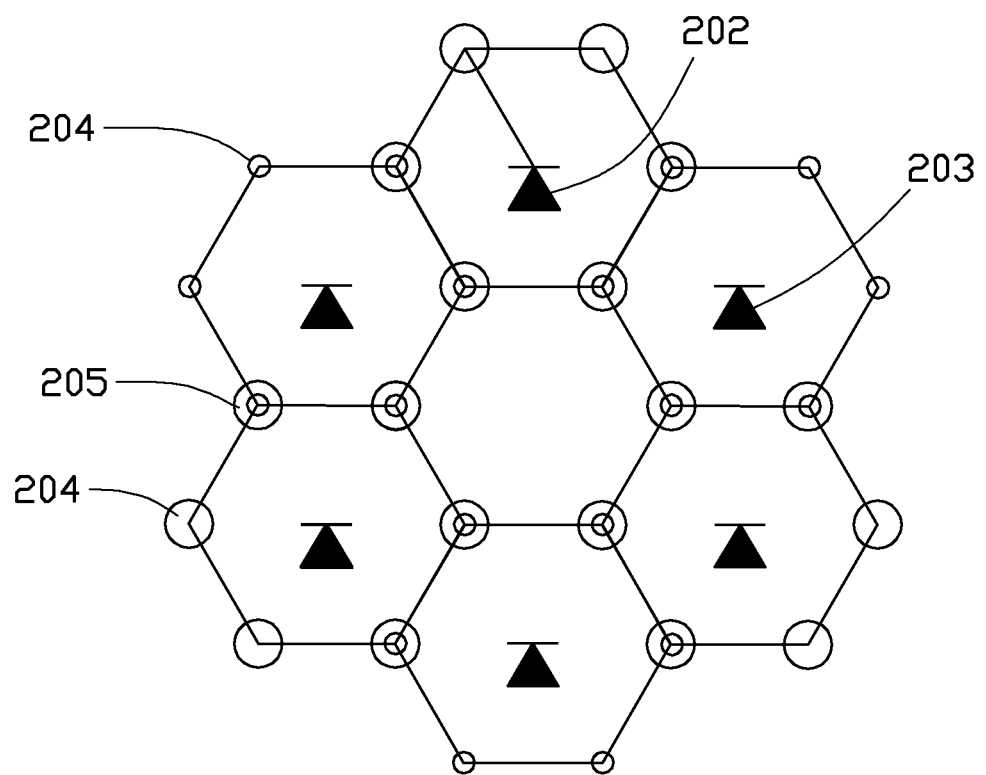
FIG. 4 is a schematic, planar view showing the arrangement of partial virtual light sources formed by the LED illuminating device FIG. 1.
Figure 5:
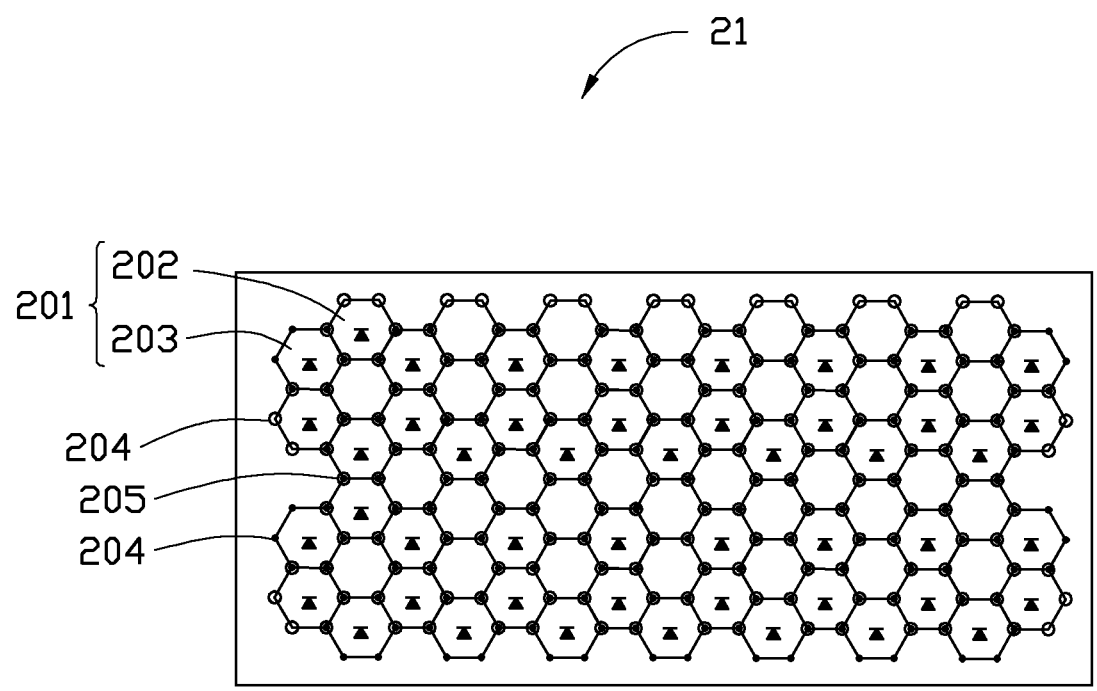
FIG. 5 is a schematic view of the virtual light sources formed by the LED units of FIG. 1.

Referring to FIGS. 3-5, the LED units 201 are arranged in a matrix. The LEDs units 201 include a number of first LED units 202 emitting light of a first color, and a number of second LED units 203 emitting light of a second color different from the first color. The LED units 201 are arranged in a staggered fashion and any two adjacent LED units 201 emit different colors. Six virtual light sources 204 are reflected to the circuit board 20 by the six-point stars 322 of the prism sheet 30 when the light is emitted by a particular LED unit 201. The six virtual light sources 202 are generally distributed on a circle, which has a center aligned with the particular LED unit 201. The value of the radius R of the circle is influenced by the distance between the prism sheet 30 and the LED units 201. Each two adjacent LED units 201 are spaced a preset distance apart, six virtual mixed light sources 205 are formed on the circuit board 20 when the light emitted by an LED unit 201 mixes with light emitted by three adjacent LED units 201 on the circuit board 20. In the embodiment, the preset distance between each two adjacent LED units 201 is $\sqrt{3}R$. A third color of light different from the first color and the second color can be obtained by mixing the first color light and the second color light.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An LED illuminating device comprising:
    a housing comprising a base plate;
    a prism sheet mounted in the housing and comprising a light incident surface facing LED units and a light exit surface opposite to the light incident surface; wherein a plurality of V-shaped micro-grooves are formed on the light exit surface, the V-shaped micro-grooves extend along three directions and intersect with each other;
    a circuit board fixed on the base plate; and a plurality of LED units being alternately arranged on the circuit board; wherein the LED units comprise a plurality of first LED units emitting light of a first color and a plurality of second LED units emitting light of a second color, the second color is different from the first color, three second LED units are evenly arranged by a first preset distance around each of the first LED units; wherein each LED unit is configured to illuminate a portion of the prism sheet, the illuminated portion of the prism sheet includes six distinct light outputting portions each configured to output light originally from said LED unit, the six light outputting portions are distributed on a circle which has a center aligned with said LED unit, and the first preset distance is $\sqrt{3}$ times as long as the radius of the circle, so as to generate six virtual mixed light sources by combining the light emitted by the corresponding first LED unit and three adjacent LED units when the light enters the prism sheet, wherein each of the virtual mixed light sources has a color different from the colors of the light emitted from the first LED units and the second LED units.

2. The LED illuminating device of claim 1, wherein the prism sheet is made of transparent plastic.

3. The LED illuminating device of claim 1, wherein the housing comprises a side wall extending around the base plate, the base plate and the side wall cooperatively forming a receiving room, the circuit board and the prism sheet are received in the receiving room, the prism sheet is arranged above the circuit board and substantially parallel to the base plate.

4. The LED illuminating device of claim 1, further comprising a protective cover, wherein the protective cover is made of transparent plastic and fixed on the sidewall above the prism sheet.

5. The LED illuminating device of claim 1, wherein the V-shaped micro-grooves comprises a plurality of first rectangular type of V-shaped micro-grooves extending along a first direction, a plurality of second rectangular type of V-shaped micro-grooves extending along a second direction, and a plurality of third rectangular type of V-shaped micro-grooves extending along a third direction intersecting with the first direction and the second direction.

6. The LED illuminating device of claim 5, wherein an angle between each two of the first, second and third directions is 60 degrees.

* * * * *